United States Patent
Sakhnini et al.

(10) Patent No.: US 11,540,324 B2
(45) Date of Patent: Dec. 27, 2022

(54) VARIABLE RANDOM ACCESS CHANNEL CONTENTION RESOLUTION WINDOW IN A NON-TERRESTRIAL NETWORK

(71) Applicant: QUALCOMM Incorporated, San Diego, CA (US)

(72) Inventors: Iyab Issam Sakhnini, San Diego, CA (US); Xiao Feng Wang, San Diego, CA (US); Huilin Xu, San Diego, CA (US); Jun Ma, San Diego, CA (US); Peter Gaal, San Diego, CA (US); Dan Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 151 days.

(21) Appl. No.: 16/903,640

(22) Filed: Jun. 17, 2020

(65) Prior Publication Data
US 2020/0404713 A1 Dec. 24, 2020

Related U.S. Application Data

(60) Provisional application No. 62/862,944, filed on Jun. 18, 2019.

(51) Int. Cl.
*H04W 72/04* (2009.01)
*H04W 74/08* (2009.01)
*H04W 24/08* (2009.01)

(52) U.S. Cl.
CPC ....... *H04W 74/0833* (2013.01); *H04W 24/08* (2013.01); *H04W 72/042* (2013.01)

(58) Field of Classification Search
CPC ............. H04W 24/08; H04W 74/0833; H04W 72/042; H04W 84/06; H04W 56/0045; H04W 48/12; H04W 24/02; H04B 7/1851
See application file for complete search history.

(56) References Cited

U.S. PATENT DOCUMENTS

2015/0181544 A1  6/2015 Liu et al.
2017/0339660 A1* 11/2017 Kazmi ............... H04W 64/003
(Continued)

OTHER PUBLICATIONS

Ericsson: "On Random Access for NTN", 3GPP Draft, R2-1817765, On Random Access for NTN, 3rd Generation Partnership Project (3GPP), Mobile Competence Centre, 650, Route Des Lucioles, F-06921 Sophia-Antipolis Cedex, France, vol. RAN WG2, No. Spokane, US, Nov. 12, 2018-Nov. 16, 2018, Nov. 12, 2018 (Nov. 12, 2018), XP051557282, 4 pages, Retrieved from the Internet: URL: http://www.3gpp.org/ftp/Meetings%5F3GPP%5FSYNC/RAN2/Docs/R2%2D1817765%2Ezip. [retrieved on Nov. 12, 2018] Paragraph 112 Discussion 11.

(Continued)

*Primary Examiner* — Chi Ho A Lee
*Assistant Examiner* — Andrew Lee
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit a physical uplink shared channel (PUSCH) message associated with a random access channel (RACH) procedure to a non-terrestrial network node. The UE may monitor a physical downlink control channel (PDCCH) for a contention resolution message associated with the RACH procedure during a contention resolution window. In some aspects, the UE may start to monitor the PDCCH a variable time period after the PUSCH message is transmitted. Numerous other aspects are provided.

52 Claims, 9 Drawing Sheets

(56) References Cited

U.S. PATENT DOCUMENTS

| | | | | |
|---|---|---|---|---|
| 2019/0149365 | A1* | 5/2019 | Chatterjee | H04L 5/0044 370/329 |
| 2019/0281588 | A1* | 9/2019 | Zhang | H04L 5/0051 |
| 2020/0413451 | A1* | 12/2020 | Taherzadeh Boroujeni | H04W 56/005 |
| 2021/0185652 | A1* | 6/2021 | Rune | H04L 5/0053 |
| 2021/0297199 | A1* | 9/2021 | Miao | H04B 7/063 |
| 2022/0007208 | A1* | 1/2022 | Zhou | H04L 5/0051 |
| 2022/0007455 | A1* | 1/2022 | Hong | H04L 29/06 |

OTHER PUBLICATIONS

Huawei et al., "Discussion on Timing Advance and RACH Procedures for NTN", 3GPP Draft, R1-1904000, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699411, 7 Pages, Retrieved from the Internet: URL: http://www.3gpp.org/ftp/Meetings%5F3GPP%5FSYNC/RAN1/Docs/R1%2D1904000%2Ezip. [retrieved on Apr. 7, 2019]. Paragraph "2.2.3 ra-ContentionResolutionTimer".

International Search Report and Written Opinion—PCT/US2020/038328—ISA/EPO—dated Sep. 22, 2020.

Nomor R.G., et al., "Initial Random Access Procedure in Non-Terrestrial Networks (NTN)", 3GPP Draft, R2-1818510, RACH, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 12, 2018 (Nov. 12, 2018), XP051557995, 6 pages, Retrieved from the Internet: URL: http://www.3gpp.org/ftp/Meetings%5F3GPP%5FSYNC/RAN2/Docs/R2%2D1818510%2Ezip. [retrieved on Nov. 12, 2018] Paragraph "2.2 Random Access Response".

* cited by examiner

VARIABLE RANDOM ACCESS CHANNEL CONTENTION RESOLUTION WINDOW IN A NON-TERRESTRIAL NETWORK

CROSS-REFERENCE TO RELATED APPLICATION

This application claims priority to U.S. Provisional Application No. 62/862,944, filed on Jun. 18, 2019, entitled "VARIABLE RANDOM ACCESS CHANNEL (RACH) CONTENTION RESOLUTION WINDOW IN A NON-TERRESTRIAL NETWORK," which is hereby expressly incorporated by reference herein.

FIELD OF THE DISCLOSURE

Aspects of the present disclosure generally relate to wireless communication and to techniques and apparatuses for a variable random access channel (RACH) contention resolution window in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a physical uplink shared channel (PUSCH) message associated with a random access channel (RACH) procedure to a non-terrestrial network node; and monitoring a physical downlink control channel (PDCCH) for a contention resolution message during a contention resolution window, wherein the UE starts to monitor the PDCCH a variable time period after the PUSCH message is transmitted.

In some aspects, a UE for wireless communication may include a memory and one or more processors coupled with the memory. The memory and the one or more processors may be configured to transmit a PUSCH message associated with a RACH procedure to a non-terrestrial network node; and monitor a PDCCH for a contention resolution message during a contention resolution window, wherein the memory and the one or more processors are configured to start to monitor the PDCCH a variable time period after the PUSCH message is transmitted.

In some aspects, a non-transitory computer-readable medium may store one or more instructions for wireless communication. The one or more instructions, when executed by one or more processors of a UE, may cause the one or more processors to: transmit a PUSCH message associated with a RACH procedure to a non-terrestrial network node; and monitor a PDCCH for a contention resolution message during a contention resolution window, wherein the UE starts to monitor the PDCCH a variable time period after the PUSCH message is transmitted.

In some aspects, an apparatus for wireless communication may include means for transmitting a PUSCH message associated with a RACH procedure to a non-terrestrial network node; and means for monitoring a PDCCH for a contention resolution message during a contention resolution window, wherein the UE starts to monitor the PDCCH a variable time period after the PUSCH message is transmitted.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
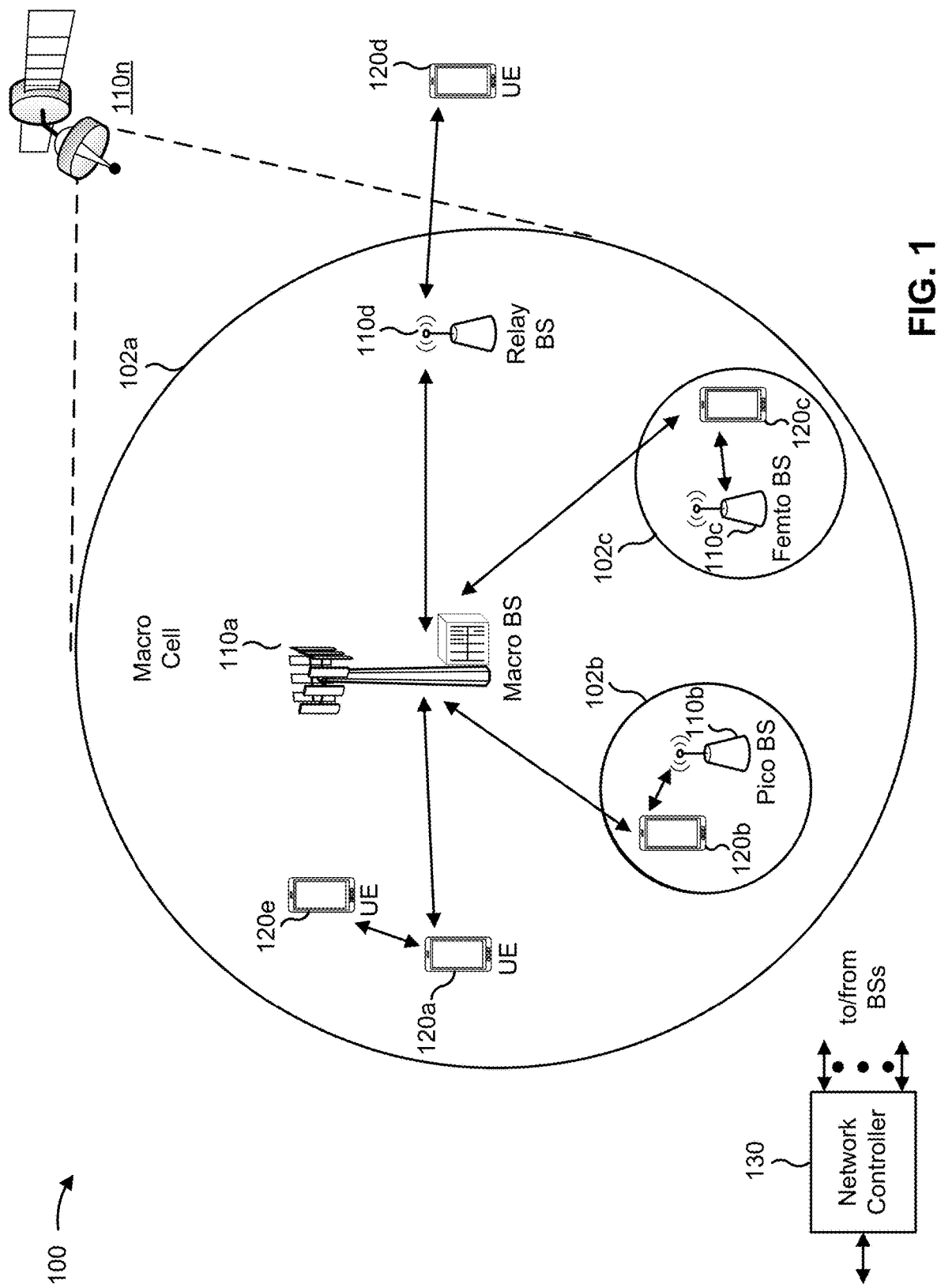
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

In some aspects, wireless network 100 may be a non-terrestrial network that includes at least one non-terrestrial network node 110n. As used herein, a non-terrestrial network may refer to a network for which access is enabled, at least in part, by non-terrestrial network node 110n. For example, in some aspects, non-terrestrial network node 110n may operate in a transparent mode as a repeater or relay station to relay communications between one or more UEs 120 and one or more terrestrial base stations 110 (e.g., a base station 110 located on the ground). Additionally, or alternatively, non-terrestrial network node 110n may operate in a regenerative mode as a base station that provides one or more cells of wireless network 100. In some aspects, non-terrestrial network node 110n may be located on an airborne vehicle or a vehicle in orbit, such as a satellite, a high altitude platform station (HAPS), a balloon, a dirigible, an airplane, an airship, an unmanned aerial vehicle, a drone, and/or the like.

Wireless network 100 may be a heterogeneous network that includes BSs of different types (e.g., macro BSs, pico BSs, femto BSs, relay BSs, and/or the like). These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., a remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
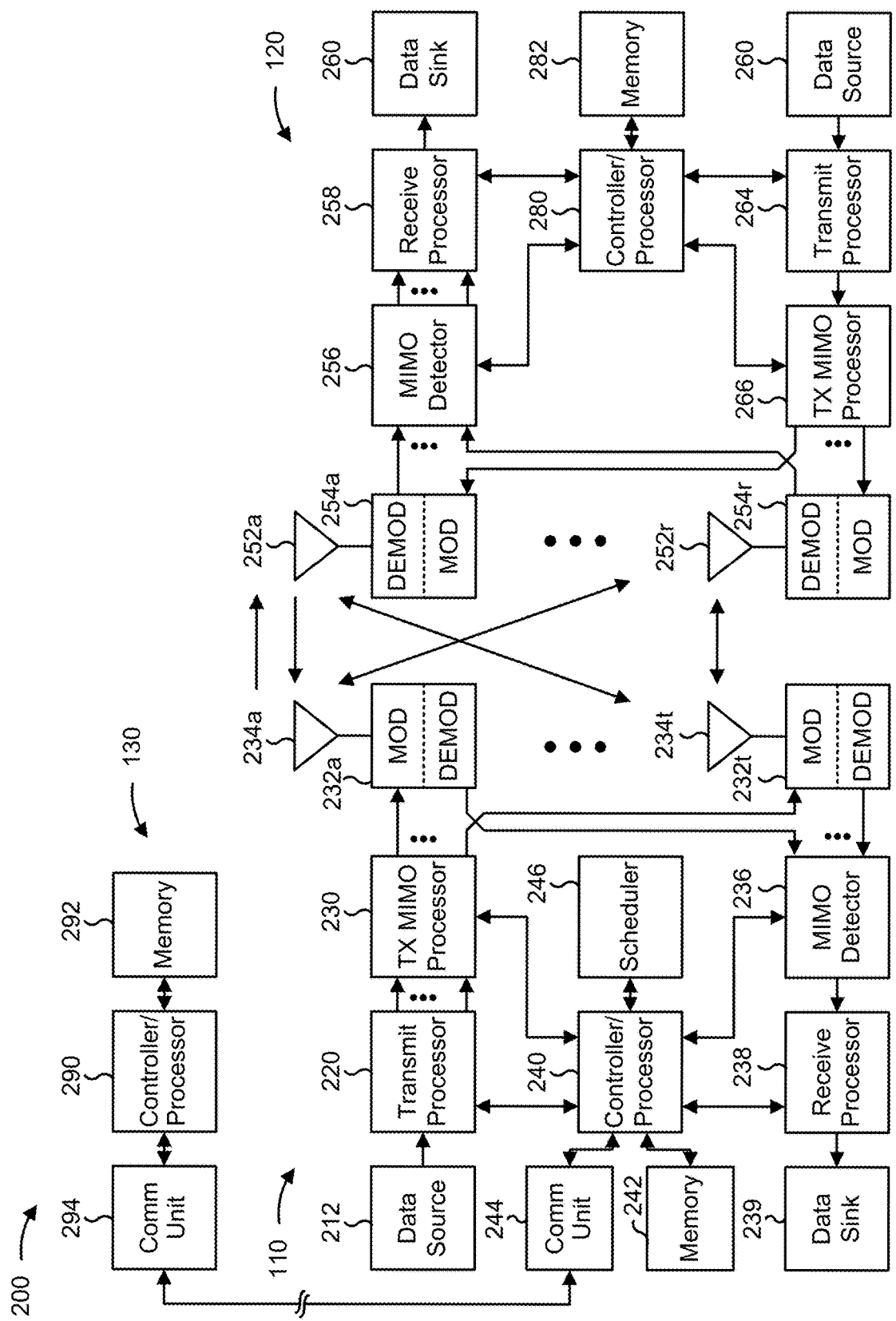
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a variable random access channel (RACH) contention resolution window in a non-terrestrial network, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 900 of FIG. 9 and/or other processes as described herein. A scheduler 246 may schedule UEs for data transmission on the downlink and/or uplink.

In some aspects, UE 120 may include means for transmitting a physical uplink shared channel (PUSCH) message associated with a RACH procedure to a non-terrestrial network node, means for monitoring a physical downlink control channel (PDCCH) for a contention resolution message during a contention resolution window that starts a variable time period after the PUSCH message is transmitted, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
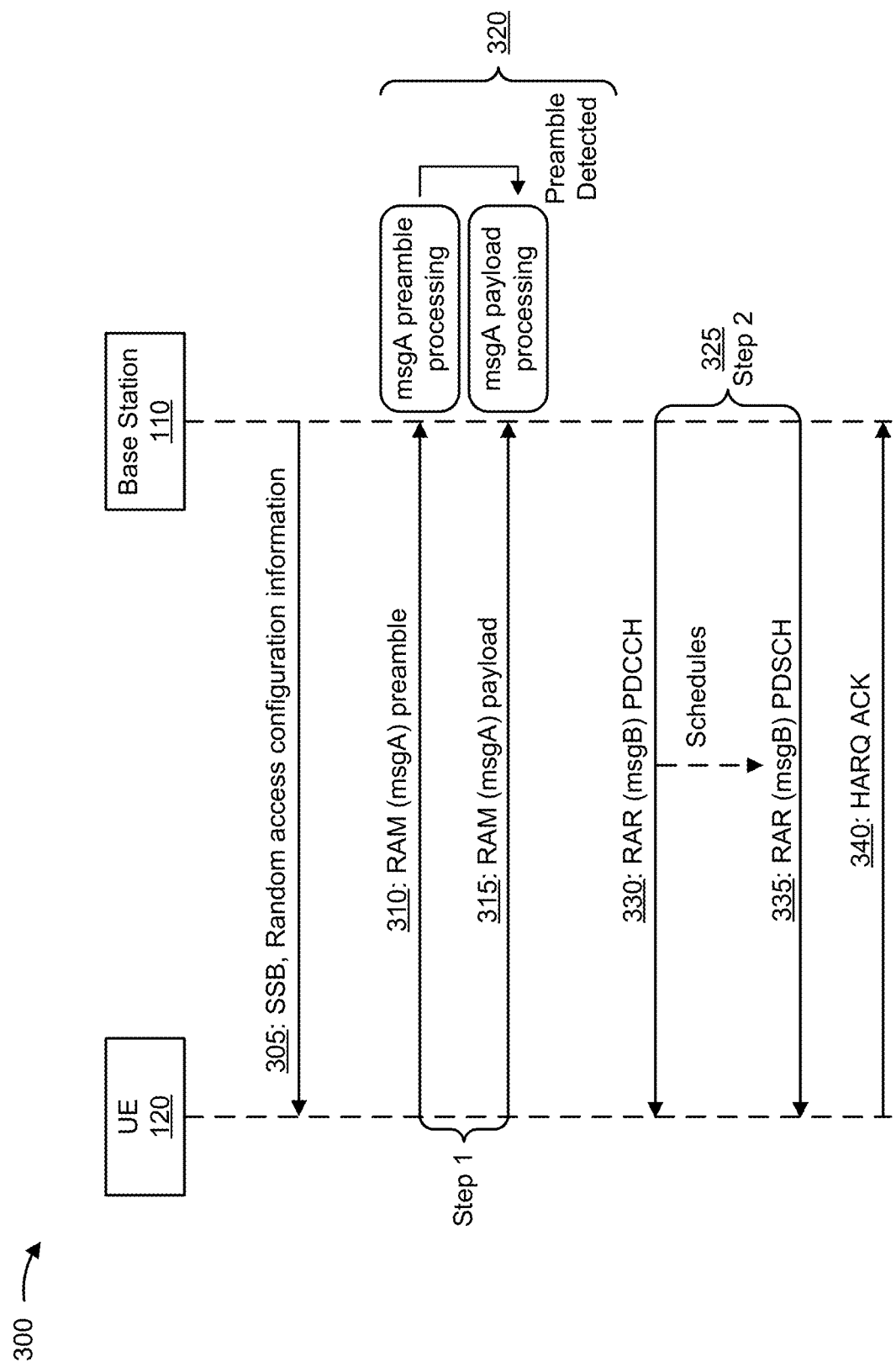
FIG. 3 is a diagram illustrating an example of a two-step random access channel (RACH) procedure, in accordance with various aspects of the present disclosure.

FIG. 3 is a diagram illustrating an example 300 of a two-step RACH procedure, in accordance with various aspects of the present disclosure. As shown in FIG. 3, a base station 110 and a UE 120 may communicate with one another to perform the two-step RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a PDCCH order message that triggers a RACH procedure, such as for contention-free random access. The random access configuration information may include one or more parameters to be used in the two-step RACH procedure, such as one or more parameters for transmitting a random access message (RAM), receiving a random access response (RAR) to the RAM, and/or the like.

As shown by reference number 310, the UE 120 may transmit, and the base station 110 may receive, a RAM preamble. As shown by reference number 315, the UE 120 may transmit, and the base station 110 may receive, a RAM payload. As shown, the UE 120 may transmit the RAM preamble and the RAM payload to the base station 110 as part of an initial (or first) step of the two-step RACH procedure. In some aspects, the RAM may be referred to as message A, msgA, a first message, an initial message, and/or the like in a two-step RACH procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of a four-step RACH procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a PUSCH transmission, and/or the like).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit an RAR (sometimes referred to as an RAR message). As shown, the base station 110 may transmit the RAR message as part of a second step of the two-step RACH procedure. In some aspects, the RAR message may be referred to as message B, msgB, or a second message in a two-step RACH procedure. The RAR message may include some or all of the contents of message 2 (msg2) and message 4 (msg4) of a four-step RACH procedure. For example, the RAR message may include the detected PRACH preamble identifier, the detected UE identifier, a timing advance value, contention resolution information, and/or the like.

As shown by reference number 330, as part of the second step of the two-step RACH procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step RACH procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
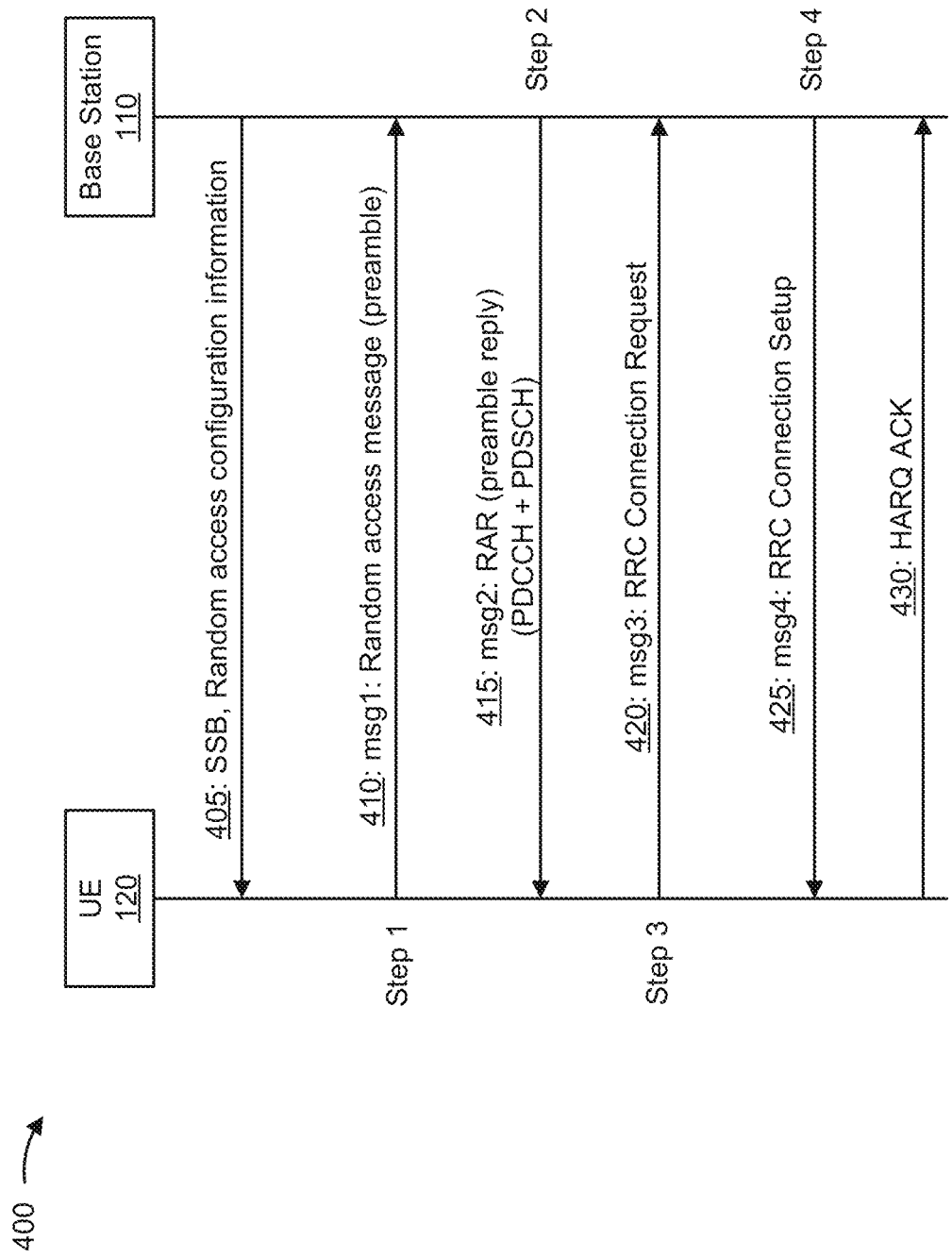
FIG. 4 is a diagram illustrating an example of a four-step RACH procedure, in accordance with various aspects of the present disclosure.

FIG. 4 is a diagram illustrating an example 400 of a four-step RACH procedure, in accordance with various aspects of the present disclosure. As shown in FIG. 4, a base station 110 and a UE 120 may communicate with one another to perform the four-step RACH procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIB s and/or the like) and/or an SSB, such as for contention-based random access. Additionally, or alternatively, the random access configuration information may be transmitted in a RRC message and/or a PDCCH order message that triggers a RACH procedure, such as for contention-free random access. The random access configuration information may include one or more parameters to be used in the RACH procedure, such as one or more parameters for transmitting a RAM, one or more parameters for receiving an RAR, and/or the like.

As shown by reference number 410, the UE 120 may transmit a RAM, which may include a preamble (sometimes referred to as a random access preamble, a PRACH preamble, a RAM preamble, and/or the like). The message that includes the preamble may be referred to as a message 1, msg1, MSG1, a first message, an initial message, and/or the like in a four-step RACH procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step RACH procedure, the base station 110 may transmit the PDSCH communication for the RAR, as scheduled by the PDCCH communication. The RAR may be included in a MAC PDU of the PDSCH communication.

As shown by reference number 420, the UE 120 may transmit an RRC connection request message. The RRC connection request message may be referred to as message 3, msg3, MSG3, or a third message of a four-step RACH procedure. In some aspects, the RRC connection request may include a UE identifier, UCI, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step RACH procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a HARQ ACK.

As indicated above, FIG. 4 is provided as an example. Other examples may differ from what is described with regard to FIG. 4.

Figure 5:
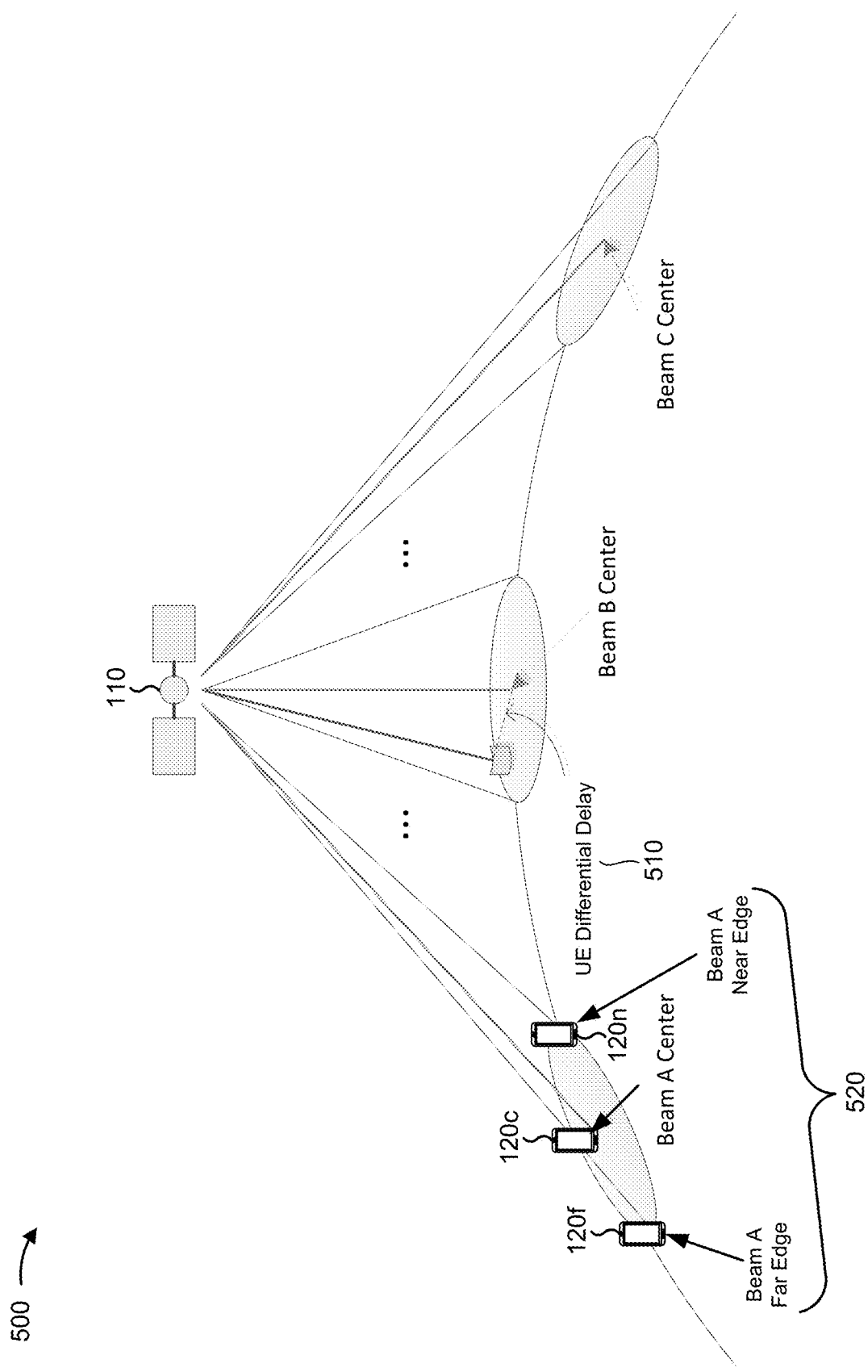
FIG. 5 is a diagram illustrating an example non-terrestrial network, in accordance with various aspects of the present disclosure.

FIG. 5 is a diagram illustrating an example non-terrestrial network 500, in accordance with various aspects of the present disclosure. In general, a non-terrestrial network may refer to a wireless access network in which access is enabled, at least in part, via a non-terrestrial network node 110 that may be located on an airborne vehicle or a vehicle in orbit, such as a satellite, a high altitude platform station (e.g., an airborne station, such as a balloon, an aircraft, an unmanned aerial vehicle, and/or the like), and/or the like. For example, non-terrestrial network node 110 may operate in a transparent mode to relay communications between ground stations (e.g., where non-terrestrial network node 110 acts as a repeater or relay station between a UE 120 and a terrestrial base station located at a gateway). Additionally, or alternatively, non-terrestrial network node 110 may operate in a regenerative node to serve as a base station for one or more UEs 120. In general, airborne vehicles or vehicles in orbit are less vulnerable to natural disasters than terrestrial base stations 110 located on the ground, and thus non-terrestrial network nodes 110 can provide emergency network access. Furthermore, such non-terrestrial network nodes 110 may provide wider service coverage than terrestrial base stations 110. However, non-terrestrial networks present different technical challenges than terrestrial networks.

For example, due to the long distance between UEs 120 and non-terrestrial network node 110, non-terrestrial network 500 may be associated with much longer delays (e.g., longer latencies) than a terrestrial network, such as up to a 600 millisecond round-trip delay and/or the like. Furthermore, because non-terrestrial network node 110 may have a large coverage area, different beams that non-terrestrial network node 110 uses to communicate with UEs 120 may have a relatively large variation in delays (e.g., as compared to a terrestrial base station). To account for this variation in delays on different beams and to account for the large common delay experienced within a particular beam, non-terrestrial network node 110 may broadcast a delay for a specific beam to UEs 120 prior to initial network access. For example, non-terrestrial network node 110 may signal a delay associated with a center of the beam, such as "Beam A Center," "Beam B Center," and "Beam C Center" shown in FIG. 5. All UEs 120 that communicate via that beam may then adjust a timing for a PRACH preamble used for initial network access based on the signaled delay.

Furthermore, because delay can also have wide variation within a coverage area of a specific beam, different UEs 120 located within the coverage area (e.g., in different geographic locations) may also be subject to different delays. In other words, even after all of the UEs 120 that communicate via a particular beam adjust timing according to the signaled delay at the center of the beam, each UE 120 may still have a residual timing offset that depends on the respective locations of each UE 120 within the beam. In FIG. 5, this is shown by reference number 510 as a differential delay for a UE 120 located at an edge of Beam B relative to a delay associated with a center of Beam B. In another example, as shown by reference number 520, there are three UEs 120 located within the coverage area of Beam A, including a first UE 120c located at the center of Beam A, a second UE 120n located at a near edge of Beam A (an edge of Beam A that is closer to non-terrestrial network node 110 than the center of Beam A), and a third UE 120f located at a far edge of Beam A (an edge of Beam A that is farther from non-terrestrial network node 110 than the center of Beam A). Accordingly, a delay experienced by UE 120c at the center of Beam A may generally be less than a delay experienced by UE 120f at the far edge of Beam A. Furthermore, because UE 120n is located at the near edge of Beam A (the edge closest to non-terrestrial network node 110), a delay experienced by UE 120n may be less than the delay experienced by UE 120c at the center of Beam A and less than the delay experienced by UE 120f at the far edge of Beam A. Accordingly, a differential delay at the near edge of a particular beam may differ from a differential delay at the far edge of the beam.

In some aspects, delays in non-terrestrial network 500 may further vary depending on a deployment type of non-terrestrial network 500, such as a low Earth orbit (LEO) (e.g., with an altitude below 2,000 kilometers (km)), a medium Earth orbit (MEO) (e.g., with an altitude from 2,000 km to below approximately 35,786 km), a geosynchronous orbit (GSO) or geostationary orbit (GEO) (e.g., that matches Earth's sidereal rotation period with an altitude of approximately 35,786 km), a high Earth orbit (HEO) (e.g., with an altitude above approximately 35,786 km), and/or the like. Accordingly, because a distance from non-terrestrial network node 110 to UEs 120 located at or near Earth's surface may differ in these different non-terrestrial network deployment types, delays for a service link from non-terrestrial network node 110 to UEs 120 may vary depending on the deployment type. Furthermore, in cases where non-terrestrial network node 110 operates in a transparent mode as a repeater or relay station between one or more UEs 120 and one or more ground stations (e.g., a terrestrial gateway, a terrestrial base station, and/or the like), a delay for a feeder link from the non-terrestrial network node 110 to the one or more ground stations may be variable in time and different for each non-terrestrial network node 110 for similar reasons.

As indicated above, FIG. 5 is provided as an example. Other examples may differ from what is described with respect to FIG. 5.

Figure 6:
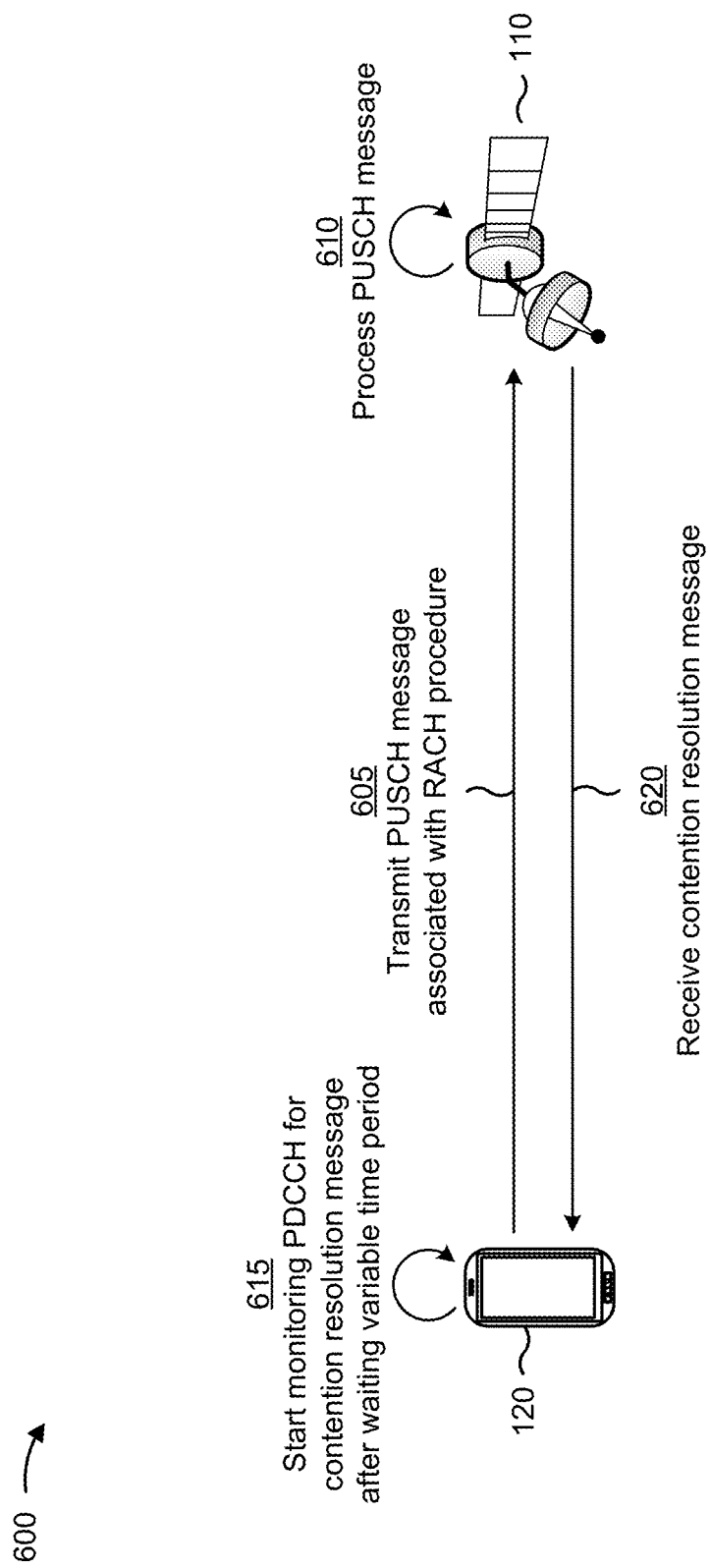
FIG. 6 is a diagram illustrating an example related to a variable RACH contention resolution window in a non-terrestrial network, in accordance with various aspects of the present disclosure.

FIG. 6 is a diagram illustrating an example 600 related to a variable RACH contention resolution window in a non-terrestrial network, in accordance with various aspects of the present disclosure.

In some aspects, to obtain initial access to the non-terrestrial network, a UE 120 may perform a RACH procedure. For example, in some aspects, the RACH procedure may be a four-step RACH procedure that includes four steps (or messages) that are performed to synchronize UE 120 to the non-terrestrial network (e.g., by obtaining uplink timing information). In a first step, after acquiring system information from a non-terrestrial network node 110 (e.g., in a SIB), UE 120 may transmit a PRACH preamble with a random access radio network temporary identity (RA-RNTI) to non-terrestrial network node 110, which may be referred to as message 1 of the RACH procedure. Message 2 in the RACH procedure is a RAR message, which is a downlink message in response to the PRACH preamble. For example, after sending the PRACH preamble, UE 120 may search for the RAR message addressed to UE 120 starting from a pre-determined RAR window start time until an RAR window size elapses (the RAR window size is signaled to the UE). The RAR window start time is defined as the time between a last symbol (or slot) of a PRACH occasion and a starting symbol (or slot) of an RAR window. In a terrestrial network, the RAR window start time is fixed. In a non-terrestrial network, however, having a fixed RAR window start time may not be ideal due to variable (and/or large) feeder link delay, variable (and/or large) service link delay, and/or whether the BS is operating as a transparent satellite or a regenerative satellite. Accordingly, in some aspects, the non-terrestrial network may use a variable RAR window start time to account for feeder link delays, service link delays, deployment type, and/or the like.

In general, there are a finite quantity of PRACH preambles, which may result in collisions if multiple UEs 120 in a given area use the same PRACH preamble in message 1. Accordingly, the RACH procedure may be a contention-based RACH procedure in which the non-terrestrial network may resolve the potential contention among UEs 120 in a contention resolution message. For example, in some aspects, the RACH procedure may include a contention resolution phase in which UE 120 may transmit a PUSCH message on an uplink after receiving the RAR message, referred to as message 3 in the four-step RACH procedure. Accordingly, message 4 in the four-step RACH procedure is a contention resolution message sent to UE 120 on a downlink in response to the PUSCH message. Conventionally, a contention resolution window starts (or restarts) immediately after message 3 is sent (e.g., in a new PUSCH message, a HARQ retransmission, and/or the like). For example, upon sending the PUSCH message, a UE 120 is to start a timer (e.g., ra-ContentionResolutionTimer) and monitor a PDCCH while the timer is running. During this time, the UE 120 monitors the PDCCH and attempts to detect a contention resolution message that includes DCI with a cyclic redundancy check (CRC) scrambled by a temporary cell radio network temporary identity (TC-RNTI) scheduling a PDSCH that includes a contention resolution identity for the UE 120 (e.g., to resolve a collision in which the UE 120 and another UE 120 use the same PRACH preamble in message 1).

In a non-terrestrial network, due to large service and/or feeder link delays, the contention resolution message can typically be expected to arrive at the UE 120 a considerable time period after the PUSCH message is transmitted. Furthermore, the amount of time that elapses after the PUSCH message before the contention resolution message can be expected to arrive at the UE 120 may be variable depending on a feeder link delay, a service link delay, a deployment type (e.g., whether the non-terrestrial network node 110 is operating in a transparent or regenerative mode), and/or the like. Accordingly, starting the timer associated with the contention resolution window immediately after the PUSCH message is transmitted can lead to the UE 120 monitoring the PDCCH for a substantial time period before the contention resolution message is actually expected and/or received. During this time when the UE 120 monitors the PDCCH with no prospect that the contention resolution message will be received, the UE 120 may consume battery power, processor resources, and/or the like.

Some techniques and apparatuses described herein may employ a variable start time and/or a variable duration for the contention resolution window that follows the PUSCH message in a RACH procedure (e.g., message 3 in a four-step RACH procedure or a msgA payload in a two-step RACH procedure) in a non-terrestrial network. For example, in some aspects, the UE 120 may start to monitor the PDCCH for the contention resolution message after waiting a variable time period that is based on one or more link delays (e.g., service and/or feeder link delays), differential delays within a beam used for communication between the UE 120 and the non-terrestrial network node 110, a symbol time for the PUSCH message, a processing time for the PUSCH message, a timing advance command indicated in a RAR message (e.g., message 2 or msgB) of the RACH procedure, and/or the like. In this way, the UE 120 may enter a sleep mode or other low-power state, delay monitoring the PDCCH, and/or the like until a time when the contention resolution message can be expected to be received at the UE 120. In this way, the UE 120 conserves battery resources, processor resources, and/or the like that would otherwise be consumed by starting to monitor the PDCCH for the contention resolution message immediately after sending the PUSCH message.

Furthermore, in some aspects, the UE 120 may employ an extended duration for the contention resolution window, which decreases a probability that large and/or variable delays in the non-terrestrial network will cause the timer to expire before the contention resolution message is received at the UE 120. In this way, resources of the UE 120, the non-terrestrial network node 110, and/or the like are conserved by avoiding a need to perform and/or process retransmissions that would otherwise be performed if the contention resolution window expires.

For example, as shown in FIG. 6, and by reference number 605, the UE 120 may transmit the PUSCH message (e.g., message 3 of the four-step RACH procedure, or msgA payload of the two-step RACH procedure) to the non-terrestrial network node 110. As further shown in FIG. 6, and by reference number 610, the PUSCH message may be received at the non-terrestrial network node 110, which may then process the PUSCH message. For example, when the non-terrestrial network node 110 is operating in a regenerative mode as a base station serving the UE 120, the non-terrestrial network node 110 may process the PUSCH message by preparing a contention resolution message that includes a contention resolution identity for the UE 120, a TC-RNTI for the UE 120, and/or the like. Additionally, or alternatively, when the non-terrestrial network node 110 is operating in a transparent mode as a relay station between the UE 120 and a terrestrial base station, the non-terrestrial network node 110 may process the PUSCH message by relaying the PUSCH message to the terrestrial base station, receiving the contention resolution message from the terrestrial base station, and preparing to relay the contention resolution message to the UE 120.

As further shown in FIG. 6, and by reference number 615, the UE 120 may wait a variable time period after the PUSCH message is transmitted before starting to monitor the PDCCH for the contention resolution message. In some aspects, the UE 120 may autonomously determine the variable time period by calculating a round-trip delay (RTD) between the UE 120 and the non-terrestrial network node 110 (e.g., using position location capabilities, a triangulation technique, and/or the like), and the variable time period may be some function of the RTD. Additionally, or alternatively, the variable time period may be signaled to the UE 120 (e.g., in one or more downlink messages associated with the RACH procedure, such as message 2 in a four-step RACH procedure, a SIB that is broadcasted prior to message 1 in a four-step RACH procedure or msgA in a two-step RACH procedure, and/or the like). For example, in some aspects, the variable time period signaled to the UE 120 may have a predefined or fixed value, a network-determined value that may be dependent on various conditions (e.g., service and/or feeder link delays for the non-terrestrial network node 110, delays associated with different beams, delays at different altitudes, and/or the like).

For example, when operating in a regenerative mode as a base station for the UE 120, the non-terrestrial network node 110 may determine the variable time period according to the following expression:

$$T_{CR\_start} \geq 2T_{SL} + T_B - T_{DD} - T_{symb},$$

where $T_{CR\_start}$ is the variable time period that the UE 120 waits before starting to monitor the PDCCH, $T_{SL}$ is the service link delay between the UE 120 and the non-terrestrial network node 110 (which is doubled to account for a bi-directional delay on the service link), $T_B$ is a sum of a symbol time ($T_{symb}$) and a processing time ($T_{proc}$) at a base station (which is the non-terrestrial network node 110 in this case), and $T_{DD}$ is a maximum one-way differential delay within a beam used for communication between the UE 120 and the non-terrestrial network node 110.

Additionally, or alternatively, when operating in a transparent mode as a relay station between the UE 120 and a terrestrial base station, the non-terrestrial network node 110 may determine the variable time period according to the expression:

$$T_{CR\_start} \geq 2T_{FL} + 2T_{SL} + T_B - T_{DD} - T_{symb},$$

where $T_{CR\_start}$ is the variable time period, $T_{FL}$ is the feeder link delay between the non-terrestrial network node 110 and the terrestrial base station (which is doubled to account for a bi-directional delay on the feeder link), $T_{SL}$ is the service link delay (which is also doubled to account for the bi-directional delay on the service link), $T_B$ is the sum of the symbol time ($T_{symb}$) and the processing time ($T_{proc}$) at the terrestrial base station, and $T_{DD}$ is a maximum one-way differential delay within the beam used for communication between the UE 120 and the non-terrestrial network node 110. Furthermore, because the feeder link may be dependent on deployment (e.g., altitude of the non-terrestrial network node 110, location of the terrestrial base station, and/or the like), $T_{FL}$ may be the maximum feeder link delay in the non-terrestrial network.

In some aspects, the variable time period that the UE 120 waits before starting to monitor the PDCCH may be based on a RAR window start time used for message 2 of the RACH procedure and an additional delta. For example, when the UE 120 sends the PRACH preamble in message 1 or msgA, the UE 120 waits a certain amount of time before starting to monitor for the RAR message, As mentioned above, the RAR window start time may be fixed, or the RAR window start time may be variable to account for feeder link delays, service link delays, deployment type, and/or the like. Accordingly, the UE 120 may use the RAR window start time for message 2 or msgB plus an additional delta as the variable time period to wait before starting to monitor the PDCCH. In some aspects, the additional delta may be fixed or predefined, or the additional delta may be signaled to the UE 120 (e.g., based on $T_{DD}$, the maximum one-way differential delay within the beam used for communication between the UE 120 and the non-terrestrial network node 110). For example, the RAR window start time is based on message 1 or msgA in the RACH procedure, which refers to PRACH preambles that are transmitted by UEs 120 that are unaligned in time (e.g., because the UEs 120 have not yet synchronized to network timing). However, in the case of a four-step RACH procedure, the contention resolution window is based on message 3, which is time-aligned after the UEs 120 have synchronized to network timing. Accordingly, a difference between the shortest RAR window start time and the contention resolution window start time is ~3 $T_{DD}$, which may be used as the additional delta to be added to the RAR window start time.

Additionally, or alternatively, the variable time period that the UE 120 waits before starting to monitor the PDCCH may be based on an RTD value at the center of the beam used for communication between the UE 120 and the non-terrestrial network node 110 plus an additional delta. For example, as mentioned above, the RTD value at the center of the beam is generally signaled to the UE 120 to account for the large common delays within a particular beam. In this case, the additional delta may similarly be fixed or predefined, or the additional delta may be signaled to the UE 120 (e.g., based on $T_{DD}$, the maximum one-way differential delay within the beam used for communication between the UE 120 and the non-terrestrial network node 110).

In some aspects, the variable time period that the UE 120 waits before starting to monitor the PDCCH may have a null value (e.g., in cases where no network-assisted measures are implemented to enable the UE 120 to wait before starting to monitor the PDCCH, the UE 120 lacks capabilities to calculate the RTD between the UE 120 and the non-terrestrial network node 110, and/or the like). In such cases, the UE 120 may start to monitor the PDCCH immediately after transmitting the PUSCH message and use an extended duration for the contention resolution window. For example, the extended duration may be determined based on a sum of an expected arrival time for the contention resolution message in a terrestrial network (e.g., a default value for the contention resolution timer) and an additional time that is based at least in part on a communication delay between the UE and the non-terrestrial network node.

Accordingly, as further shown in FIG. 6, and by reference number 620, the UE 120 may receive the contention resolution message (e.g., message 4 in the four-step RACH procedure, or msgB in the two-step RACH procedure) from the non-terrestrial network node 110 after the UE 120 starts to monitor the PDCCH. By waiting the variable time period to start to monitor the PDCCH, the UE 120 conserves battery power, processing resources, and/or the like during the variable time period when the contention resolution message is not expected to be received due to the large and variable delays in the non-terrestrial network. Furthermore, in cases where the contention resolution window has an extended duration, the likelihood of the contention resolution window expiring due to the large and/or variable delays in the non-terrestrial network is reduced.

As indicated above, FIG. 6 is provided as an example. Other examples may differ from what is described with respect to FIG. 6. For example, although some aspects are described herein in terms of how the contention resolution window may have a variable start time and/or a variable duration in a four-step RACH procedure, it will be appreciated that the same or similar concepts may be applied to a two-step RACH procedure (e.g., a UE may start to monitor a downlink channel for a RAR message (msgB in a two-step RACH procedure) that includes some or all of the contents that are normally included in message 4 of a four-step RACH procedure a variable time period after transmitting a RAM (e.g., msgA in the two-step RACH procedure).

Figure 7:
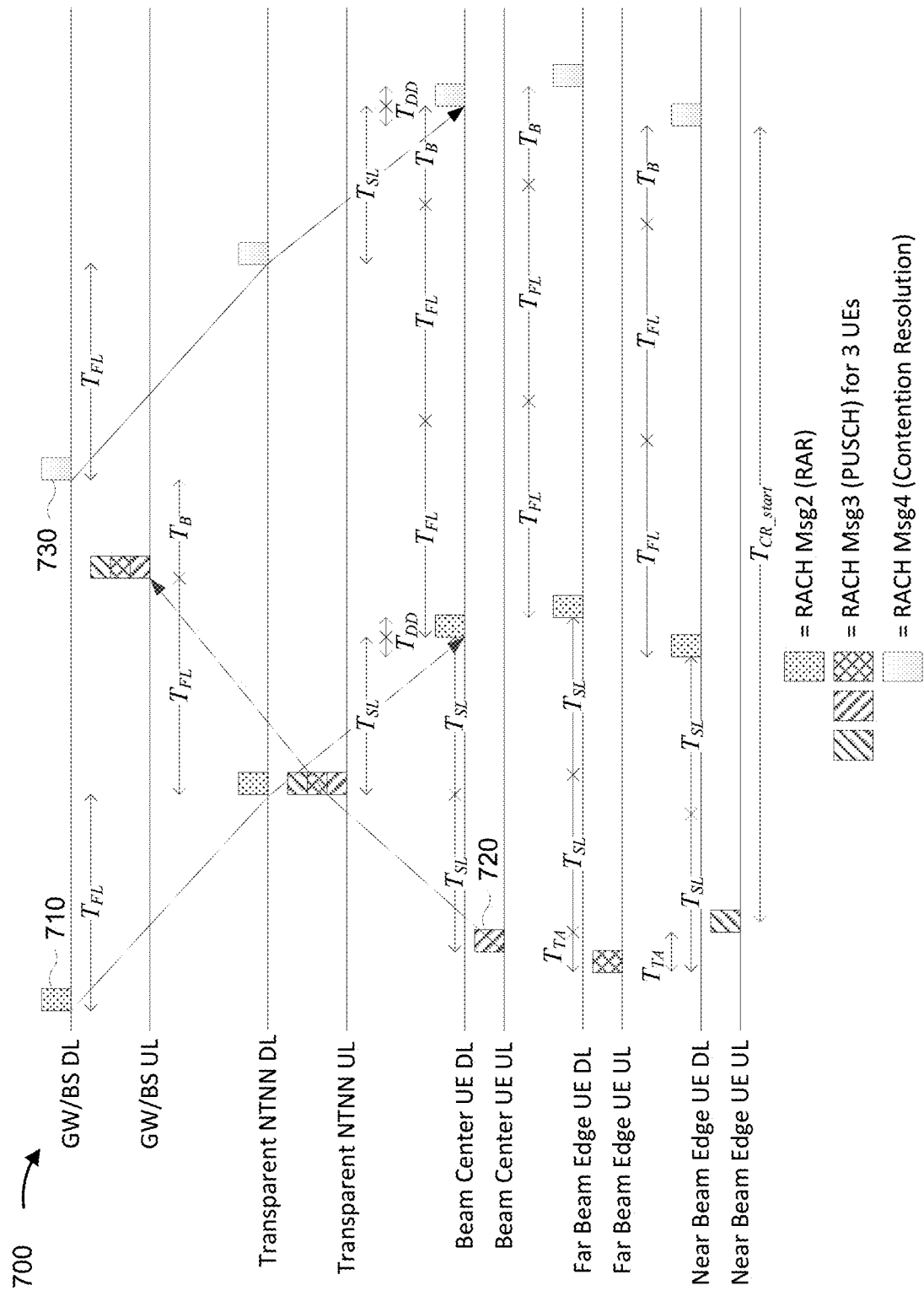
FIG. 7 is a diagram illustrating an example related to a variable RACH contention resolution window when a non-terrestrial network node is operating as a relay station, in accordance with various aspects of the present disclosure.

FIG. 7 is a diagram illustrating an example 700 related to a variable RACH contention resolution window when a non-terrestrial network node is operating as a relay station, in accordance with various aspects of the present disclosure. The example 700 shown in FIG. 7 illustrates timing that may be related to determining, calculating, or otherwise configuring the variable time period that a UE is allowed to wait after transmitting a PUSCH message (e.g., a msgA payload in a two-step RACH procedure, message 3 in a four-step RACH procedure, and/or the like) before starting to monitor a PDCCH for a contention resolution message (e.g., a msgB PDCCH in a two-step RACH procedure, message 4 in a four-step RACH procedure, and/or the like) in cases where the non-terrestrial network node is operating in a transparent mode to relay communication between the UE and a network node (e.g., a terrestrial node) implementing functionality of a gateway (GW) and a base station (BS), which may be referred to herein as a gateway/base station, a GW/BS, and/or the like.

In particular, FIG. 7 shows downlink and uplink transmissions for the GW/BS, downlink and uplink transmissions for the transparent non-terrestrial network node (NTNN), and downlink and uplink transmissions for three UEs that are using a particular beam to communicate with the transparent non-terrestrial network node. In particular, the three UEs include a first UE located at a center of the beam ("Beam Center UE"), a second UE located at a far edge of the beam ("Far Beam Edge UE"), and a third UE located at a near edge of the beam ("Near Beam Edge UE"). As mentioned elsewhere herein, the delays that the various UEs experience at the center, the far edge, and the near edge of the beam may differ due to variable distances between the respective UEs and the transparent non-terrestrial network node, and the variable time period ($T_{CR\_start}$) that the various UEs wait before starting to monitor the PDCCH for the contention resolution message may take these differences into account.

For example, in FIG. 7, reference number 710 shows a downlink transmission that the GW/BS sends to the UEs via the transparent non-terrestrial network node. This downlink transmission, which corresponds to the RAR message, message 2 in the four-step RACH procedure, and/or the like, may be subject to various delays, including a feeder link delay ($T_{FL}$) and a service link delay ($T_{SL}$). In particular, the feeder link delay may correspond to a delay between a time when the GW/BS sends the RAR message and a time when the RAR message arrives at the transparent non-terrestrial network node. Furthermore, the service link delay may correspond to a delay between a time when the transparent non-terrestrial network node relays the RAR message and a time when the RAR message arrives at the UE located at the center of the beam. Notably, due to the variable distances between the UEs and the transparent non-terrestrial network node, the RAR message may arrive at the UE located at the near edge of the beam before the RAR message arrives at the UE located at the center of the beam, and the RAR message may arrive at the UE located at the far edge of the beam after the RAR message arrives at the UE located at the center of the beam.

Accordingly, as shown in FIG. 7, there may be a maximum one-way differential within the beam ($T_{DD}$), which may be factored into the variable time period $T_{CR\_start}$. Furthermore, due to the variable distances (and thus variable service link delays) between the UEs and the transparent non-terrestrial network node, the RAR message may include a timing advance command that specifies an offset between the start of a received downlink transmission (e.g., the RAR message) and a transmitted uplink subframe (e.g., the PUSCH message to be transmitted as message 3 in the RACH procedure). This offset, represented in FIG. 7 as $T_{TA}$, is used to ensure that downlink and uplink transmissions are synchronized. For example, because the UE located at the far edge of the beam experiences larger service link delays than the UEs located at the center and/or near edge of the beam, the UE located at the far edge of the beam may initiate an uplink transmission in advance compared to the UEs located at the center and/or near edge of the beam. Similarly, because the UE located at the near edge of the beam experiences smaller service link delays than the UEs located at the center and/or far edge of the beam, the UE located at the far edge of the beam may initiate the same uplink transmission later than the UEs located at the center and/or far edge of the beam.

Accordingly, as further shown in FIG. 7, and by reference number 720, the UEs may each send an uplink transmission corresponding to the PUSCH message to the transparent non-terrestrial network node, and the uplink transmissions may arrive at the transparent non-terrestrial network node at substantially the same time. In addition to the service link delays between the UEs and the transparent non-terrestrial network node and the feeder link delay between the transparent non-terrestrial network node and the GW/BS, the PUSCH message may be associated with a processing delay, represented in FIG. 7 as $T_B$. In particular, the processing delay may be a sum of a symbol time for the PUSCH message, $T_{symb}$, and a processing time at the GW/BS, $T_{proc}$. Accordingly, based on these various delays, a contention resolution window (e.g., a time period during which the UEs monitor the PDCCH for the contention resolution message, shown by reference number 730) may start a variable time period after the UEs transmit the PUSCH message, which allows the UEs to avoid monitoring the PDCCH during a time prior to when the contention resolution message is expected to arrive at the UEs and thereby conserve battery power, processing resources, and/or the like. For example, and as described elsewhere herein, the contention resolution window start time may be determined based on the following expression:

$$T_{CR\_start} \geq 2T_{FL} + 2T_{SL} + T_B - T_{DD} - T_{symb},$$

where $T_{CR\_start}$ is the variable time period that the UEs wait after transmitting the PUSCH message before starting to monitor the PDCCH for the contention resolution message, $T_{FL}$ is the feeder link delay between the transparent non-terrestrial network node and the GW/BS (which is doubled to account for the bi-directional delay on the feeder link), $T_{SL}$ is the service link delay at the center of the beam (which is also doubled to account for the bi-directional delay on the service link), $T_B$ is the sum of the symbol time ($T_{symb}$) for the PUSCH message and the processing time ($T_{proc}$) for the PUSCH message at the GW/BS, and $T_{DD}$ is the maximum one-way differential delay within the beam used for communication between the various UEs and the transparent non-terrestrial network node.

As indicated above, FIG. 7 is provided as an example. Other examples may differ from what is described with respect to FIG. 7.

Figure 8:
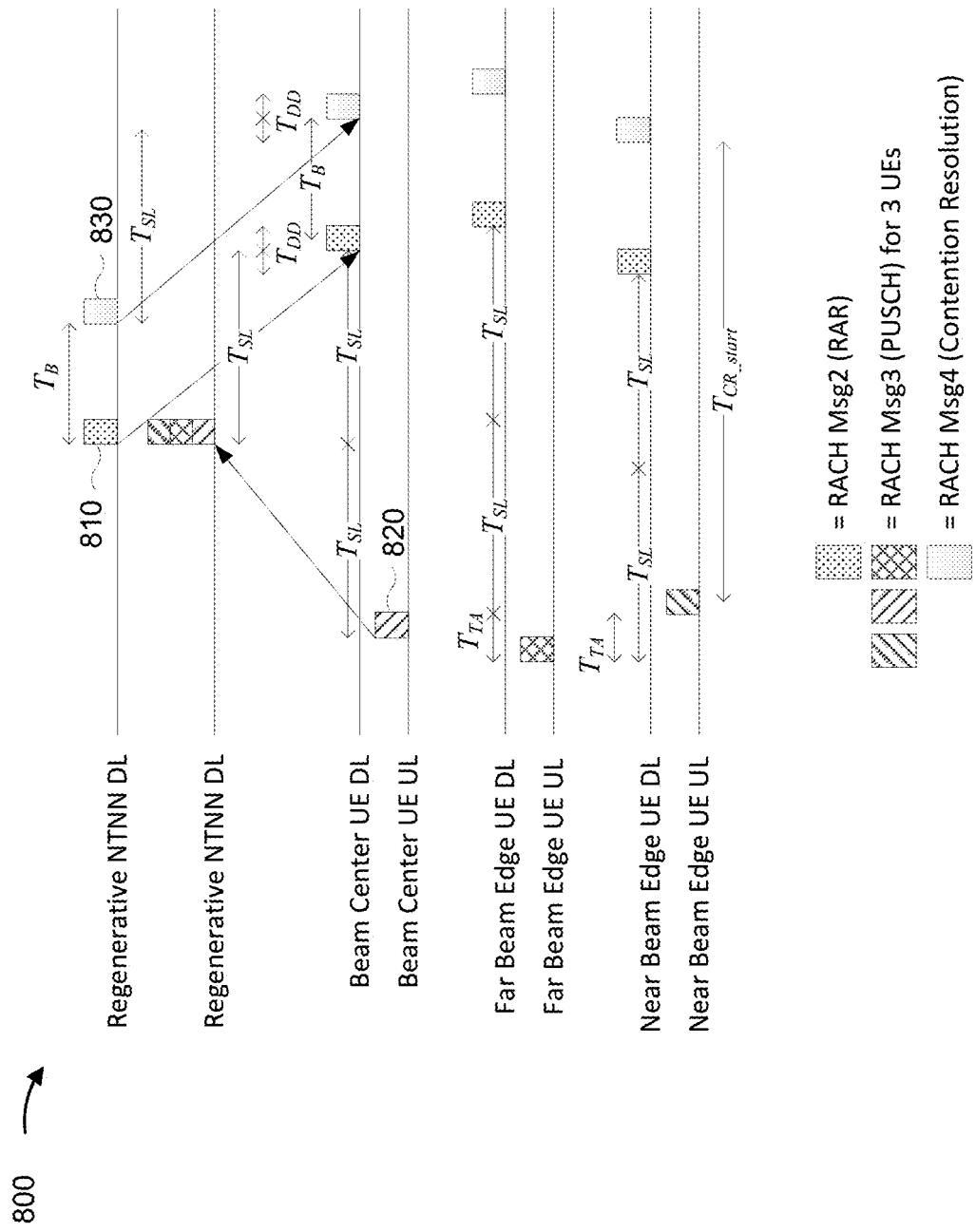
FIG. 8 is a diagram illustrating an example related to a variable RACH contention resolution window when a non-terrestrial network node is operating as a base station, in accordance with various aspects of the present disclosure.

FIG. 8 is a diagram illustrating an example 800 related to a variable RACH contention resolution window when a non-terrestrial network node is operating as a base station, in accordance with various aspects of the present disclosure. The example 800 shown in FIG. 8 illustrates timing that may be related to determining, calculating, or otherwise configuring the variable time period that a UE is allowed to wait after transmitting a PUSCH message (e.g., a msgA payload in a two-step RACH procedure, message 3 in a four-step RACH procedure, and/or the like) before starting to monitor a PDCCH for a contention resolution message (e.g., a msgB PDCCH in a two-step RACH procedure, message 4 in a four-step RACH procedure, and/or the like) in cases where the non-terrestrial network node is operating in a regenerative mode (e.g., as an airborne or non-terrestrial base station).

In particular, FIG. 8 shows downlink and uplink transmissions for the regenerative non-terrestrial network node (NTNN) and downlink and uplink transmissions for three UEs that are using a particular beam to communicate with the regenerative non-terrestrial network node. In particular, the three UEs include a first UE located at a center of the beam ("Beam Center UE"), a second UE located at a far edge of the beam ("Far Beam Edge UE"), and a third UE located at a near edge of the beam ("Near Beam Edge UE"). As mentioned elsewhere herein, the delays that the various UEs experience at the center, the far edge, and the near edge of the beam may differ due to variable distances between the respective UEs and the regenerative non-terrestrial network node, and the variable time period ($T_{CR\_start}$) that the various UEs wait before starting to monitor the PDCCH for the contention resolution message may take these differences into account.

For example, in FIG. 8, reference number 810 shows a downlink transmission that the regenerative non-terrestrial network node sends to the UEs. This downlink transmission, which corresponds to the RAR message (e.g., msgB in the two-step RACH procedure or message 2 in the four-step RACH procedure), may be subject to a service link delay ($T_{SL}$). In particular, the service link delay may correspond to a delay between a time when the regenerative non-terrestrial network node transmits the RAR message and a time when the RAR message arrives at the UE located at the center of the beam. Notably, unlike the downlink transmission(s) described in connection with FIG. 7 above, the downlink RAR message shown by reference number 810 may not be subject to a feeder link delay because the regenerative non-terrestrial network node is operating as a base station and does not relay transmissions to and from a separate (e.g., terrestrial) gateway or base station, as was the case in FIG. 7. However, the various other timing parameters shown in FIG. 8 may be determined in a substantially similar manner as discussed above with reference to FIG. 7.

Accordingly, as further shown in FIG. 8, and by reference number 820, the UEs may each send an uplink transmission corresponding to the PUSCH message to the regenerative non-terrestrial network node after receiving the RAR message, and the uplink transmissions may arrive at the regenerative non-terrestrial network node at substantially the same time. In addition to the service link delays between the UEs and the regenerative non-terrestrial network node, the PUSCH message may be associated with a processing delay, represented in FIG. 8 as $T_B$. In particular, the processing delay may be a sum of a symbol time for the PUSCH message, $T_{symb}$, and a processing time at the regenerative non-terrestrial network node, $T_{proc}$. Accordingly, based on these various delays, a contention resolution window (e.g., a time period during which the UEs monitor the PDCCH for the contention resolution message, shown by reference number 830) may start a variable time period after the UEs transmit the PUSCH message, which allows the UEs to avoid monitoring the PDCCH during a time prior to when the contention resolution message is expected to arrive at the UEs and thereby conserve battery power, processing resources, and/or the like. For example, and as described elsewhere herein, the contention resolution window start time may be determined based on the following expression:

$$T_{CR\_start} \geq 2T_{SL}+T_B-T_{DD}-T_{symb},$$

where $T_{CR\_start}$ is the variable time period that the UEs wait after transmitting the PUSCH message before starting to monitor the PDCCH for the contention resolution message, $2 T_{SL}$ is the bi-directional service link delay at the center of the beam, $T_B$ is the sum of the symbol time ($T_{symb}$) for the PUSCH message and the processing time ($T_{proc}$) for the PUSCH message at the regenerative non-terrestrial network node, and $T_{DD}$ is the maximum one-way differential delay within the beam used for communication between the various UEs and the regenerative non-terrestrial network node.

As indicated above, FIG. 8 is provided as an example. Other examples may differ from what is described with respect to FIG. 8.

Figure 9:
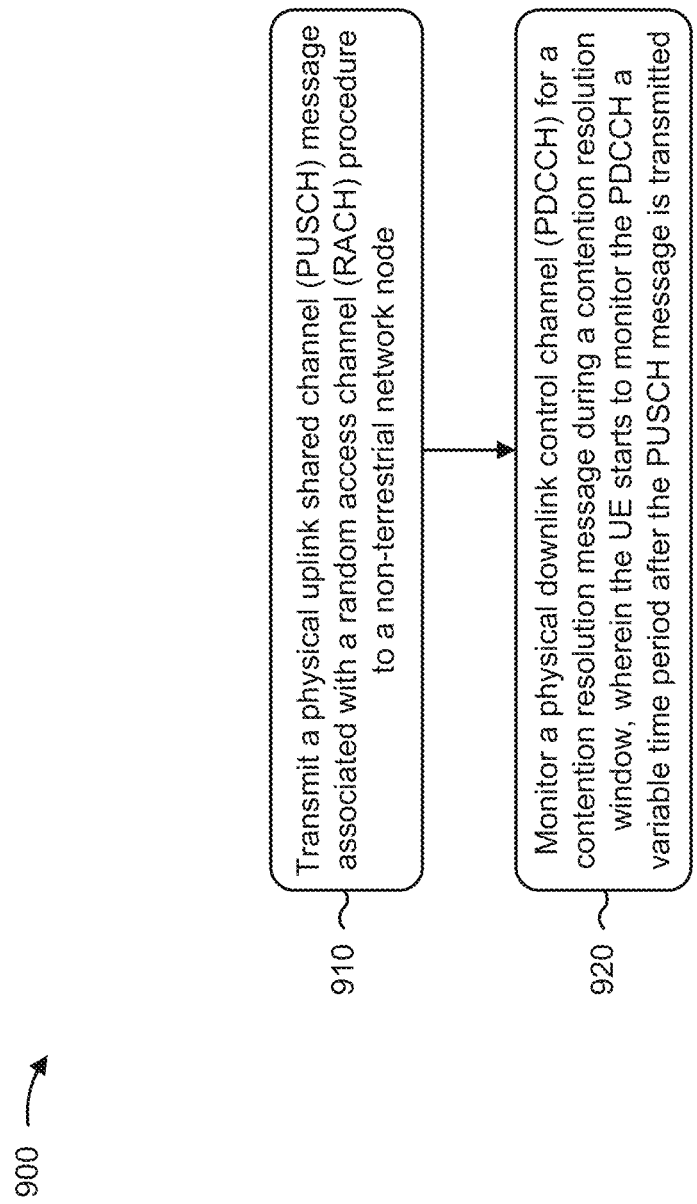
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with a variable RACH contention resolution window in a non-terrestrial network.

As shown in FIG. 9, in some aspects, process 900 may include transmitting a PUSCH message associated with a RACH procedure to a non-terrestrial network node (block 910). For example, the UE may transmit (e.g., using antenna 252, modulator 254, transmit processor 264, TX MIMO processor 266, controller/processor 280, memory 282, and/or the like) a PUSCH message associated with a RACH procedure to a non-terrestrial network node, as described above.

As further shown in FIG. 9, in some aspects, process 900 may include monitoring a PDCCH for a contention resolution message during a contention resolution window, wherein the UE starts to monitor the PDCCH a variable time period after the PUSCH message is transmitted (block 920). For example, the UE may monitor (e.g., using antenna 252, demodulator 254, MIMO detector 256, receive processor 258, controller/processor 280, memory 282, and/or the like) a PDCCH for a contention resolution message during a contention resolution window, as described above. In some aspects, the UE starts to monitor the PDCCH a variable time period after the PUSCH message is transmitted.

Process 900 may include additional aspects, such as any single aspect or any combination of aspects described below and/or in connection with one or more other processes described elsewhere herein.

In a first aspect, the UE may calculate an RTD between the UE and the non-terrestrial network node, and the variable time period has a value that is based at least in part on the RTD between the UE and the non-terrestrial network node.

In a second aspect, alone or in combination with the first aspect, the variable time period has one or more of a predefined value or a network-determined value that is signaled to the UE in one or more downlink messages associated with the RACH procedure.

In a third aspect, alone or in combination with one or more of the first and second aspects, the variable time period has a value based at least in part on a RAR window start time and a delta.

In a fourth aspect, alone or in combination with one or more of the first through third aspects, the delta has one or more of a predefined value or a network-determined value that is signaled to the UE in one or more downlink messages associated with the RACH procedure.

In a fifth aspect, alone or in combination with one or more of the first through fourth aspects, the delta has a value based at least in part on a maximum one-way differential delay within a beam used for communication between the UE and the non-terrestrial network node.

In a sixth aspect, alone or in combination with one or more of the first through fifth aspects, the variable time period has a value based at least in part on a network-signaled RTD at a center of a beam used for communication between the UE and the non-terrestrial network node and a delta.

In a seventh aspect, alone or in combination with one or more of the first through sixth aspects, the delta has one or more of a predefined value or a network-determined value that is signaled to the UE in one or more downlink messages associated with the RACH procedure.

In an eighth aspect, alone or in combination with one or more of the first through seventh aspects, the delta has a value based at least in part on a maximum one-way differential delay within the beam used for communication between the UE and the non-terrestrial network node.

In a ninth aspect, alone or in combination with one or more of the first through eighth aspects, the contention resolution window has an extended duration based at least in part on an expected arrival time for the contention resolution message in a terrestrial network and an additional time based at least in part on a communication delay between the UE and the non-terrestrial network node.

In a tenth aspect, alone or in combination with one or more of the first through ninth aspects, the variable time period has a null value.

In an eleventh aspect, alone or in combination with one or more of the first through tenth aspects, the variable time period is based at least in part on a feeder link delay between a gateway and the non-terrestrial network node, a service link delay between the UE and the non-terrestrial network node, a symbol time associated with the PUSCH message, a processing time associated with the PUSCH message at the gateway, and a differential delay within a beam used for communication between the UE and the non-terrestrial network node.

In a twelfth aspect, alone or in combination with one or more of the first through eleventh aspects, the variable time period is based at least in part on a service link delay between the UE and the non-terrestrial network node, a symbol time associated with the PUSCH message, a processing time associated with the PUSCH message at the non-terrestrial network node, and a differential delay within a beam used for communication between the UE and the non-terrestrial network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a physical uplink shared channel (PUSCH) message associated with a random access channel (RACH) procedure to a non-terrestrial network node;
    calculating a round-trip delay (RTD) between the UE and the non-terrestrial network node; and
    monitoring, after transmitting the PUSCH message and waiting a variable time period, a physical downlink control channel (PDCCH) for a contention resolution message during a contention resolution window, wherein the variable time period is based at least in part on:
        the RTD between the UE and the non-terrestrial network node,
        a feeder link delay between a gateway and the non-terrestrial network node, and
        a service link delay between the UE and the non-terrestrial network node.

2. The method of claim 1, wherein the variable time period has a value that is based at least in part on the RTD between the UE and the non-terrestrial network node.

3. The method of claim 1, wherein the variable time period has one or more of a predefined value or a network-determined value that is signaled to the UE in one or more downlink messages associated with the RACH procedure.

4. The method of claim 1, wherein the variable time period has a value based at least in part on a random access response window start time and a delta.

5. The method of claim 4, wherein the delta has one or more of a predefined value or a network-determined value that is signaled to the UE in one or more downlink messages associated with the RACH procedure.

6. The method of claim 4, wherein the delta has a value based at least in part on a maximum one-way differential delay within a beam used for communication between the UE and the non-terrestrial network node.

7. The method of claim 1, wherein the variable time period has a value based at least in part on a network-signaled round-trip delay at a center of a beam used for communication between the UE and the non-terrestrial network node and a delta.

8. The method of claim 7, wherein the delta has one or more of a predefined value or a network-determined value that is signaled to the UE in one or more downlink messages associated with the RACH procedure.

9. The method of claim 7, wherein the delta has a value based at least in part on a maximum one-way differential delay within the beam used for communication between the UE and the non-terrestrial network node.

10. The method of claim 1, wherein the contention resolution window has an extended duration based at least in part on an expected arrival time for the contention resolution message in a terrestrial network and an additional time based at least in part on a communication delay between the UE and the non-terrestrial network node.

11. The method of claim 10, wherein the variable time period has a null value.

12. The method of claim 1, wherein the variable time period is further based at least in part on at least one of a symbol time associated with the PUSCH message, a processing time associated with the PUSCH message at the gateway, and a differential delay within a beam used for communication between the UE and the non-terrestrial network node.

13. The method of claim 1, wherein the variable time period is further based at least in part on a symbol time associated with the PUSCH message, a processing time associated with the PUSCH message at the non-terrestrial network node, and a differential delay within a beam used for communication between the UE and the non-terrestrial network node.

14. A user equipment (UE) for wireless communication, comprising:
a memory; and
one or more processors coupled with the memory, the one or more processors configured to:
transmit a physical uplink shared channel (PUSCH) message associated with a random access channel (RACH) procedure to a non-terrestrial network node;
calculate a round-trip delay (RTD) between the UE and the non-terrestrial network node; and
monitor, after transmitting the PUSCH message and waiting a variable time period, a physical downlink control channel (PDCCH) for a contention resolution message during a contention resolution window, wherein the variable time period is based at least in part on:
the RTD between the UE and the non-terrestrial network node,
a feeder link delay between a gateway and the non-terrestrial network node, and
a service link delay between the UE and the non-terrestrial network node.

15. The UE of claim 14, wherein the variable time period has a value that is based at least in part on the RTD between the UE and the non-terrestrial network node.

16. The UE of claim 14, wherein the variable time period has one or more of a predefined value or a network-determined value that is signaled to the UE in one or more downlink messages associated with the RACH procedure.

17. The UE of claim 14, wherein the variable time period has a value based at least in part on a random access response window start time and a delta.

18. The UE of claim 17, wherein the delta has one or more of a predefined value or a network-determined value that is signaled to the UE in one or more downlink messages associated with the RACH procedure.

19. The UE of claim 17, wherein the delta has a value based at least in part on a maximum one-way differential delay within a beam used for communication between the UE and the non-terrestrial network node.

20. The UE of claim 14, wherein the variable time period has a value based at least in part on a network-signaled round-trip delay at a center of a beam used for communication between the UE and the non-terrestrial network node and a delta.

21. The UE of claim 20, wherein the delta has one or more of a predefined value or a network-determined value that is signaled to the UE in one or more downlink messages associated with the RACH procedure.

22. The UE of claim 20, wherein the delta has a value based at least in part on a maximum one-way differential delay within the beam used for communication between the UE and the non-terrestrial network node.

23. The UE of claim 14, wherein the contention resolution window has an extended duration based at least in part on an expected arrival time for the contention resolution message in a terrestrial network and an additional time based at least in part on a communication delay between the UE and the non-terrestrial network node.

24. The UE of claim 23, wherein the variable time period has a null value.

25. The UE of claim 14, wherein the variable time period is further based at least in part on at least one of a symbol time associated with the PUSCH message, a processing time associated with the PUSCH message at the gateway, and a differential delay within a beam used for communication between the UE and the non-terrestrial network node.

26. The UE of claim 14, wherein the variable time period is further based at least in part on a symbol time associated with the PUSCH message, a processing time associated with the PUSCH message at the non-terrestrial network node, and a differential delay within a beam used for communication between the UE and the non-terrestrial network node.

27. A non-transitory computer-readable medium storing one or more instructions for wireless communication, the one or more instructions comprising:
one or more instructions that, when executed by one or more processors of a user equipment (UE), cause the one or more processors to:
transmit a physical uplink shared channel (PUSCH) message associated with a random access channel procedure to a non-terrestrial network node;
calculate a round-trip delay (RTD) between the UE and the non-terrestrial network node; and
monitor, after transmitting the PUSCH message and waiting a variable time period, a physical downlink control channel (PDCCH) for a contention resolution message during a contention resolution window, wherein the variable time period is based at least in part on:
the RTD between the UE and the non-terrestrial network node,
a feeder link delay between a gateway and the non-terrestrial network node, and
a service link delay between the UE and the non-terrestrial network node.

28. The non-transitory computer-readable medium of claim 27, wherein the variable time period has a value that is based at least in part on the RTD between the UE and the non-terrestrial network node.

29. The non-transitory computer-readable medium of claim 27, wherein the variable time period has one or more of a predefined value or a network-determined value that is signaled to the UE in one or more downlink messages associated with the RACH procedure.

30. The non-transitory computer-readable medium of claim 27, wherein the variable time period has a value based at least in part on a random access response window start time and a delta.

31. The non-transitory computer-readable medium of claim 30, wherein the delta has one or more of a predefined value or a network-determined value that is signaled to the UE in one or more downlink messages associated with the RACH procedure.

32. The non-transitory computer-readable medium of claim 30, wherein the delta has a value based at least in part on a maximum one-way differential delay within a beam used for communication between the UE and the non-terrestrial network node.

33. The non-transitory computer-readable medium of claim 27, wherein the variable time period has a value based at least in part on a network-signaled round-trip delay at a center of a beam used for communication between the UE and the non-terrestrial network node and a delta.

34. The non-transitory computer-readable medium of claim 33, wherein the delta has one or more of a predefined value or a network-determined value that is signaled to the UE in one or more downlink messages associated with the RACH procedure.

35. The non-transitory computer-readable medium of claim 33, wherein the delta has a value based at least in part on a maximum one-way differential delay within the beam used for communication between the UE and the non-terrestrial network node.

36. The non-transitory computer-readable medium of claim 27, wherein the contention resolution window has an extended duration based at least in part on an expected arrival time for the contention resolution message in a terrestrial network and an additional time based at least in part on a communication delay between the UE and the non-terrestrial network node.

37. The non-transitory computer-readable medium of claim 36, wherein the variable time period has a null value.

38. The non-transitory computer-readable medium of claim 27, wherein the variable time period is further based at least in part on at least one of a symbol time associated with the PUSCH message, a processing time associated with the PUSCH message at the gateway, and a differential delay within a beam used for communication between the UE and the non-terrestrial network node.

39. The non-transitory computer-readable medium of claim 27, wherein the variable time period is further based at least in part on a symbol time associated with the PUSCH message, a processing time associated with the PUSCH message at the non-terrestrial network node, and a differential delay within a beam used for communication between the UE and the non-terrestrial network node.

40. An apparatus for wireless communication, comprising:
   means for transmitting a physical uplink shared channel (PUSCH) message associated with a random access channel procedure to a non-terrestrial network node;
   means for calculating a round-trip delay (RTD) between the apparatus and the non-terrestrial network node; and
   means for monitoring, after transmitting the PUSCH message and waiting a variable time period, a physical downlink control channel (PDCCH) for a contention resolution message during a contention resolution window, wherein the variable time period is transmitted, based at least in part on the:
      RTD between the apparatus and the non-terrestrial network node,
      a feeder link delay between a gateway and the non-terrestrial network node, and
      a service link delay between the apparatus and the non-terrestrial network node.

41. The apparatus of claim 40, wherein the variable time period has a value that is based at least in part on the RTD between the apparatus and the non-terrestrial network node.

42. The apparatus of claim 40, wherein the variable time period has one or more of a predefined value or a network-determined value that is signaled to the apparatus in one or more downlink messages associated with the RACH procedure.

43. The apparatus of claim 40, wherein the variable time period has a value based at least in part on a random access response window start time and a delta.

44. The apparatus of claim 43, wherein the delta has one or more of a predefined value or a network-determined value that is signaled to the apparatus in one or more downlink messages associated with the RACH procedure.

45. The apparatus of claim 43, wherein the delta has a value based at least in part on a maximum one-way differential delay within a beam used for communication between the apparatus and the non-terrestrial network node.

46. The apparatus of claim 40, wherein the variable time period has a value based at least in part on a network-signaled round-trip delay at a center of a beam used for communication between the apparatus and the non-terrestrial network node and a delta.

47. The apparatus of claim 46, wherein the delta has one or more of a predefined value or a network-determined value that is signaled to the apparatus in one or more downlink messages associated with the RACH procedure.

48. The apparatus of claim 46, wherein the delta has a value based at least in part on a maximum one-way differential delay within the beam used for communication between the apparatus and the non-terrestrial network node.

49. The apparatus of claim 40, wherein the contention resolution window has an extended duration based at least in part on an expected arrival time for the contention resolution message in a terrestrial network and an additional time based at least in part on a communication delay between the apparatus and the non-terrestrial network node.

50. The apparatus of claim 49, wherein the variable time period has a null value.

51. The apparatus of claim 40, wherein the variable time period is further based at least in part on at least one of a symbol time associated with the PUSCH message, a processing time associated with the PUSCH message at the gateway, and a differential delay within a beam used for communication between the apparatus and the non-terrestrial network node.

52. The apparatus of claim 40, wherein the variable time period is further based at least in part on a symbol time associated with the PUSCH message, a processing time associated with the PUSCH message at the non-terrestrial network node, and a differential delay within a beam used for communication between the apparatus and the non-terrestrial network node.

* * * * *